United States Patent
Karar et al.

(10) Patent No.: US 10,211,928 B2
(45) Date of Patent: Feb. 19, 2019

(54) NONLINEAR TOLERANT CONSTANT MODULUS MULTI-DIMENSIONAL MODULATION FORMATS FOR COHERENT OPTICAL COMMUNICATION SYSTEMS

(71) Applicant: Infinera Corporation, Sunnyvale, CA (US)

(72) Inventors: Abdullah S. Karar, Ottawa (CA); Han Sun, Ottawa (CA); Kuang-Tsan Wu, Ottawa (CA)

(73) Assignee: Infinera Corporation, Sunnyvale, CA (US)

(*) Notice: Subject to any disclaimer, the term of this patent is extended or adjusted under 35 U.S.C. 154(b) by 0 days.

(21) Appl. No.: 15/925,422

(22) Filed: Mar. 19, 2018

(65) Prior Publication Data
US 2018/0269983 A1    Sep. 20, 2018

Related U.S. Application Data

(60) Provisional application No. 62/472,600, filed on Mar. 17, 2017.

(51) Int. Cl.
*H04B 10/04* (2006.01)
*H04B 10/61* (2013.01)
(Continued)

(52) U.S. Cl.
CPC .......... *H04B 10/614* (2013.01); *H04L 27/04* (2013.01); *H04J 14/06* (2013.01)

(58) Field of Classification Search
CPC .............. H04B 10/532; H04B 10/6162; H04B 10/516; H04B 10/548; H04B 10/5561;
(Continued)

(56) References Cited

U.S. PATENT DOCUMENTS

2015/0030333 A1    1/2015    Sun et al.
2016/0080091 A1*    3/2016    Thesling ................ H04B 10/60
                                                               398/188
(Continued)

OTHER PUBLICATIONS

David S. Millar, et. al., "High-dimensional modulation for coherent optical communications systems", Optics Express, vol. 22, issue 17, (2014).

(Continued)

*Primary Examiner* — Hanh Phan
(74) *Attorney, Agent, or Firm* — David L. Soltz

(57) ABSTRACT

Constant modulus multi-dimensional modulation system and methods are disclosed herein, employing multi-intensity quadrature amplitude modulation (QAM) to generate a dual-polarization symbol. j bits may be mapped to one of a plurality of dual-polarization symbols having a same constant power modulus on a two-level constellation including first and second intensity rings in a four-dimensional (4D) space including in-phase (I), quadrature (Q), X polarization (Xpol) and Y polarization (Ypol). A first bit of the j bits may indicate that the symbol is on the first intensity ring for the Xpol and the second intensity ring for the Ypol, a next k bits may indicate a location of the symbol on the first intensity ring in the Xpol, and a remaining j−k−1 bits may indicate a location of the symbol on the second intensity ring in the Ypol. Maximum correlation decoding may be used to decode the first symbol at the receiver.

18 Claims, 13 Drawing Sheets

(51) Int. Cl.
*H04L 27/04* (2006.01)
*H04J 14/06* (2006.01)

(58) Field of Classification Search
CPC .. H04B 10/612; H04B 10/613; H04B 10/614; H04J 14/06
USPC ....... 398/183, 184, 185, 186, 188, 192, 193, 398/194, 202, 205, 208, 209, 135, 136, 398/158, 15, 65, 152
See application file for complete search history.

(56) References Cited

U.S. PATENT DOCUMENTS

2016/0261347 A1 9/2016 Karar et al.
2017/0237498 A1* 8/2017 Essiambre ......... H04B 10/2543 398/136

OTHER PUBLICATIONS

A. D. Shiner et. al., "Demonstration of an 8-dimensional modulation format with reduced inter-channel nonlinearities in a polarization multiplexed coherent system", Optics Express, vol. 22, issue 17, (2014).
M. Chagnon, M. Osman, Q. Zhuge, X. Xu, and D. Plant, "Analysis and experimental demonstration of novel 8PolSK-QPSK modulation at 5 bits/symbol for passive mitigation of nonlinear impairments," Opt. Express 21, 30204-30220 (2013).
K. Kojima, D. S. Millar, T. Koike-Akino and K. Parsons, "Constant modulus 4D optimized constellation alternative for DP-8QAM," 2014 The European Conference on Optical Communication (ECOC), Cannes, (2014).
B. Lavigne et al., "Real-time 200 gb/s 8-QAM transmission over a 1800-km long SSMF-based system using add/drop 50GHz-wide filters", 2016 Optical Fiber Communications Conference and Exhibition (OFC), Anaheim, CA, USA, Mar. 20-24, 2016.

* cited by examiner

NONLINEAR TOLERANT CONSTANT MODULUS MULTI-DIMENSIONAL MODULATION FORMATS FOR COHERENT OPTICAL COMMUNICATION SYSTEMS

CROSS REFERENCE TO RELATED APPLICATIONS

This application claims the benefit of U.S. Provisional Application No. 62/472,600, filed Mar. 17, 2017, which is incorporated by reference as if fully set forth herein.

FIELD OF INVENTION

The disclosure relates generally to multi-dimensional modulation for coherent optical communication systems.

BACKGROUND

In optical communication systems, digital modulation techniques are used to convert digital information (i.e., bits) into symbols carried by optical signals (e.g., light pulses) through the optical fiber. Dispersion, or the spreading of optical signals as they travel down a fiber in time, can manifest changes in both time and frequency and makes it harder to distinguish the symbols at the receiver. Various solutions exist for dealing with optical dispersion, such as using signals at wavelengths with group velocity dispersion (GVD) equal to zero, using solution pulses in the regime of negative dispersion, or using opposite-sign dispersion fibers to cancel dispersion effects (details are outside the scope of this disclosure). However, compensating for dispersion (e.g., using GVD=0) can amplify other nonlinear effects in the optical pulses, which also make it hard to decode the symbols at the receiver. Examples of nonlinear effects include four wave mixing, where interactions between two or three wavelengths produce two new interfering wavelengths, and self-phase modulation, where variation in refractive index produce a phase shift in the optical pulse, leading to a change of the pulse's frequency spectrum.

Thus, dispersion and fiber nonlinearities are critical limiting factors on the data rates achievable by optical fiber communications systems. The increase in demand for broadband services call upon next generation optical transceivers to deliver over 1 terabit per second (Tbps) transmission rates over optical submarine links, which typically include thousands of kilometers of dispersion managed (DM) and dispersion unmanaged (UM) fiber optical cables. DM optical fiber cables use optical fibers with different amounts of dispersion, both positive and negative, distributed along the link for the purpose of obtaining zero to little dispersion at the receiver. UM fiber optical cables allow most of the accumulated dispersion to be compensated at the receiver. In all cases, coherent optical communication systems that are effectively robust to fiber nonlinearities are desirable.

SUMMARY

Constant modulus multi-dimensional modulation system and methods are disclosed herein, employing multi-intensity quadrature amplitude modulation (QAM) on each of two polarizations (the X polarization (Xpol) and Y polarization (Ypol)) to generate a dual-polarization symbol. Encoding of j bits from the stream of bits may be performed by mapping the j bits to a first symbol from a plurality of dual-polarization symbols having a same constant power modulus on a two-level modulation constellation including a first intensity ring and second intensity ring in a four-dimensional (4D) space including in-phase (I), quadrature (Q), Xpol, and Ypol. A first bit of the j bits may indicate that the first symbol is on the first intensity ring for the Xpol and the second intensity ring for the Ypol, a next k bits may indicate a location of the first symbol on the first intensity ring in the Xpol, and a remaining j−k−1 bits may indicate a location of the first symbol on the second intensity ring in the Ypol. A first analog waveform may be generated corresponding to the first symbol for transmission over an optical link. Maximum correlation decoding may be used to decode the first symbol at the receiver. In an example, j=6 bits are encoded using matrix-enhanced (ME)-8QAM, which include 12 points on each of the Xpol and Ypol constellations.

DETAILED DESCRIPTION OF THE EMBODIMENTS

Quadrature amplitude modulation (QAM) is a family of digital modulation techniques that attempt to maximize the spacing between modulated symbols in order to maximize robustness of the symbols against distortions (e.g., caused by dispersion or nonlinearity). Two-dimensional (2D) QAM techniques exploit the orthogonality of the in-phase (I) and quadrature (Q) components of the modulated signal. For example, 2QAM (equivalent to binary phase-shift keying (BPSK)), modulates one bit of information using two symbols at phases separated by 180°. In another example, 4QAM (equivalent to quadrature phase-sift keying (QPSK)) encodes two bits per symbol using four points equidistant around a circle on the in-phase versus quadrature constellation diagram. In another example, the star 8QAM constellation 100, shown in FIG. 1, encodes three bits per symbol, and includes 4 symbols on an inner intensity ring 101 and four symbols on an outer intensity ring 102 in the I versus Q plane. As discussed herein, intensity may have arbitrary units (a.u.) and may be proportional to the power ($P=V^2/R$, where P is power in Watts, V is voltage in Volts, and R is resistance in Ohms) required to transmit a symbol on the intensity ring. For example, the intensity of a symbol may be defined as equal to or proportional to the voltage squared over the resistance normalized to 1 Ohm, and may be calculated as $|I|^2+|Q|^2$, where I represents the voltage (or amplitude) of the in-phase component and Q represents the voltage (or amplitude) of the quadrature component. While many constellation configurations are possible (e.g., rectangular 8QAM), star 8QAM requires less mean power for a given minimum Euclidean distance compared to other 2D 8QAM constellations.

Figure 1:
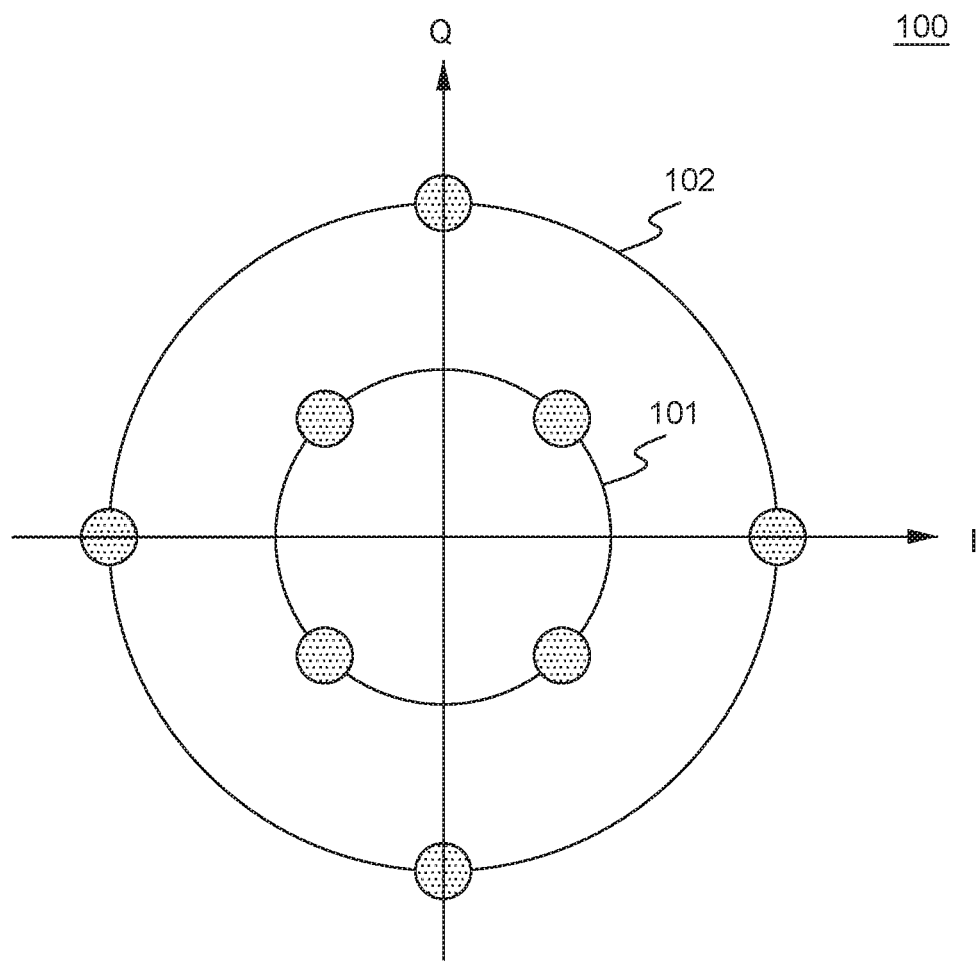
FIG. 1 is a constellation diagram of an example star 8-quadrature amplitude modulation (8QAM) constellation.

In coherent fiber-optical communications systems, modulation is possible in a four dimensional (4D) signal space due to inherent support for dual polarization in a single mode fiber (being a circular waveguide). Namely, light from a laser, for example, may be split, and the polarization of one of the split portions may be rotated to be orthogonal to the other split portion. Moreover, each polarization, which may be designated as X (or Xpol) and Y (or Y pol) herein, may carry modulated components, referred to herein as in-phase (I) and quadrature (Q). Thus, both X and Y polarized light may carry I and Q components (which may be referred to as the XI and XQ components for Xpol and YI and YQ components for Ypol), such that the resulting signal may be considered a four dimensional (4D) signal, as noted above. Multiple bits may be represented by each constellation symbol or point, resulting in a multi-level (i.e., with multiple intensity rings) 4D symbol constellation. In an example of 4D modulation, 8QAM (e.g., star 8QAM as shown in FIG. 1) may be used in each of the X and Y polarizations for a total of 8 symbols per polarization, a 3 bit per symbol encoding per polarization, or 6 bits per dual-polarization symbol.

For 4D modulation techniques with higher spectral efficiencies (i.e., having a higher bit-to-symbol ratio) beyond 4 bits per dual-polarization symbol, the multi-level amplitude modulation associated with higher order QAM may result in reduced nonlinear tolerance. This is due to the reduced Euclidian (straight-line) distance between the symbols or points on the constellation (i.e., the points of the constellation being closer together), which leads to higher risk of errors due to small perturbations of the electrical field due to nonlinear effects in the fiber. However, constant modulus 4D modulation formats, at for example 5 or 6 bits per dual-polarization symbol, exhibit improved tolerance towards nonlinear noise. The reason is that the main propagation equation for light in optical fiber exhibits a nonlinear term which is dependent on the intensity or amplitude modulation of the light pulses. As such, constant modulus signals exhibit less variability in amplitude and thus less nonlinear perturbation to the electrical field.

The disclosed constant modulus multi-dimensional modulation system and methods manipulate multiple dimensions of the optical field, over N time slots (and/or M frequency bins for optical systems using multiple subcarriers in the optical fiber), to ensure a constant or substantially constant power value for all modulated symbols. The disclosures herein are presented for 4D modulation, although the disclosed concepts may be extended to other dimensional orders of modulation (e.g., 8 dimensions). According to the disclosed constant modulus 4D modulation system and methods, a multi-level QAM technique (e.g., 8QAM) may be used on each polarization, Xpol and Ypol, to generate a dual-polarization symbol. Assuming a j bit-to-symbol encoding and a two-intensity constellation including a higher intensity ring and a lower intensity ring, one bit per symbol may be used to indicate if the symbol is on the lower intensity ring or the higher intensity ring in the constellation for a first polarization (e.g., the Xpol), which also implies that the symbol exists on the other intensity ring in the second polarization (e.g., the Ypol). In other words, a symbol exists on different intensity rings in the two polarizations Xpol and Ypol. If more than two intensity rings are used in the constellation (e.g., 3 or more intensity rings), then the concept may be extended to use two or more bits to indicate the level or intensity ring pertaining to the symbol for the first polarization (e.g., Xpol), while implying a different intensity ring for the other polarization.

For the first polarization, k bits per symbol are used for a symbol located on the lower intensity ring (e.g., k=2 bits for QPSK or four symbols on the inner ring), and j−k−1 bits per symbol are used for a symbol located on the higher intensity ring (e.g., j−k−1=3 bits for 8PSK or eight symbols on the outer ring). The remaining bits are used for the symbol location on the second polarization, which is on a different intensity ring than the first polarization. The location of the symbol on the inner and outer rings in each of the polarizations are chosen to ensure a constant power over the two polarizations across all symbols over time. In other words, the power (or intensity) of every symbol over the first and second polarizations has the same constant value, ensuring constant power for all symbols over time, as explained further below.

Figure 2A:
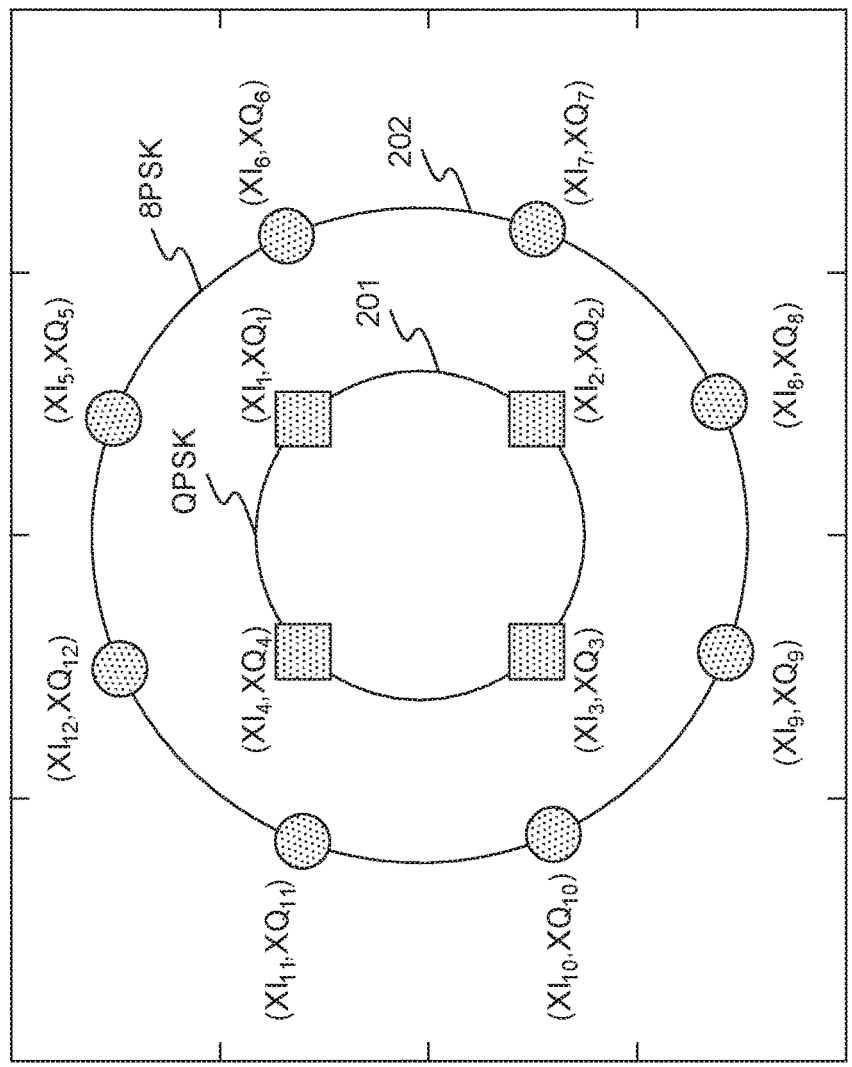
FIGS. 2A and 2B are x polarization (Xpol) and y polarization (Ypol) constellation diagrams of an example matrix enhanced (ME)-8QAM bit-to-symbol mapping, in accordance with the disclosures herein.
Figure 2A:
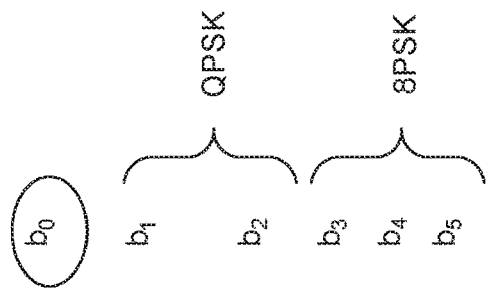
Figure 2B:
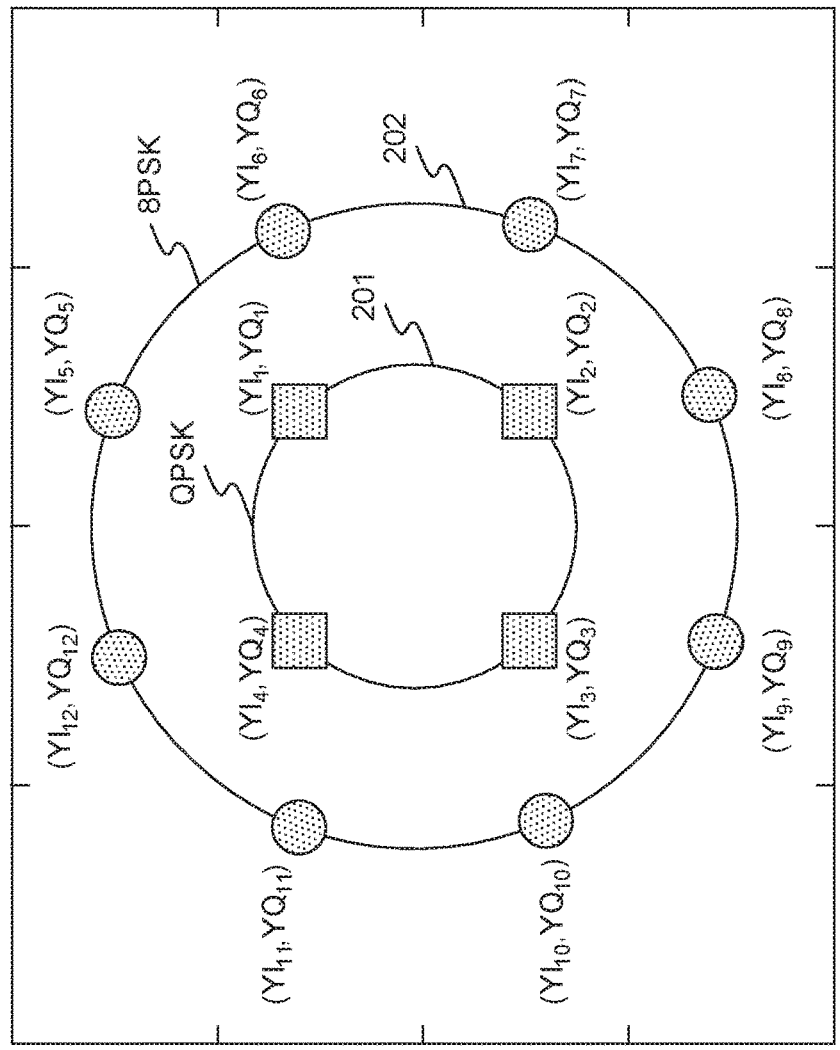
Figure 2B:
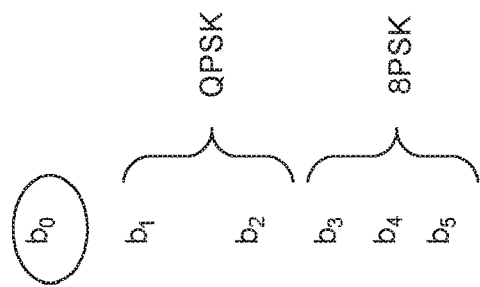

An example of the disclosed constant modulus 4D modulation system and methods is matrix-enhanced (ME)-8QAM for encoding six (6) bits per (dual-polarization) symbol. FIG. 2A is a constellation 200a of an example ME-8QAM bit-to-symbol mapping for a first polarization (e.g., Xpol), showing twelve possible symbols in an Xpol I-Q plane, and FIG. 2B shows a constellation diagram 200b of an example ME-8QAM bit-to-symbol mapping for a second polarization (e.g., Y pol) in the Ypol I-Q plane. Herein it may be assumed that XI and XQ represent the amplitudes (e.g., voltage, or other scaled value proportional to the voltage) of the I and Q components of the X polarized optical signal, and YI and YQ represent the amplitudes of the I and Q components of the Y polarized optical signal. As used herein, XI, XQ, YI, YQ may also generally refer to the I and Q components (or equivalently data lanes) of the 4D modulated symbol in the optical communication system.

The constellation 200a includes an inner intensity ring 201 including four points $(XI_1, XQ_1)$, $(XI_2, XQ_2)$, $(XI_3, XQ_3)$, $(XI_4, XQ_4)$ and an outer intensity ring 202 including eight points $(XI_5, XQ_5)$, $(XI_6, XQ_6)$, $(XI_7, XQ_7)$, $(XI_8, XQ_8)$, $(XI_9, XQ_9)$, $(XI_{10}, XQ_{10})$, $(XI_{11}, XQ_{11})$, $(XI_{12}, XQ_{12})$. The four points $(XI_1, XQ_1)$, $(XI_2, XQ_2)$, $(XI_3, XQ_3)$, $(XI_4, XQ_4)$ on inner intensity ring 201 all have the same normalized power (or constant power modulus or intensity) in the I-Q plane such that $|XI_1|^2+|XQ_1|^2=|XI_2|^2+|XQ_2|^2=|XI_3|^2+|XQ_3|^2=|XI_4|^2+|XQ_4|^2$. Similarly, the eight points on the outer ring 202 have the same normalized power. Moreover, the constellations 200a and 200b for Xpol and Ypol are equivalent to each other, such that the symbols on the inner intensity rings 201 and 203 have the same amplitude and phase, and the symbols on the outer intensity rings 202 and 204 have the same the same amplitude and phase. Although 12 points are shown in each constellation 200a and 200b resulting in 144 possible dual-polarization symbols, 64 symbols may be are used for mapping six (6) bits to ensure constant power modulus across the symbols, as described further below.

According to ME-8QAM, 6 bits $b_5b_4b_3b_2b_1$ may be mapped to a dual-polarization symbol. One bit $b_0$ may be used to indicate which intensity ring should be selected on the Xpol constellation 200a and Ypol constellation 200b, such that the rings will be different in the two polarizations. For the symbol in the Xpol constellation 200a, bit $b_0$ may indicate if the symbol is on the lower intensity inner ring 201 or the higher intensity ring 202. For the symbol in the Ypol constellation 200b, the same bit $b_0$ may be used to indicate that the symbol is on the opposite ring from the ring on the Xpol constellation 200a (i.e., the lower intensity ring 203 in Ypol constellation 200b if the symbol is on the higher intensity ring 202 in Xpol constellation 200a, and vice versa). Two bits $b_1$ and $b_2$ may be used to correspond to the location of the symbol on the inner ring (201 or 203) for the polarization constellation 200a or 200b for which the symbol exists on the inner ring and three bits $b_3$, $b_4$, and $b_5$ may be used to correspond to the location of the symbol on the outer ring (203 or 204) for the other polarization constellation 200a or 200b for which the symbol exists on the outer ring. Because all points on the inner ring (in either polarization) have the same power (and intensity), and all points on the outer ring (in either polarization) have the same power (and intensity), and a ME-8QAM dual-polarization symbol always includes a point on the inner ring in one polarization and a point on the outer ring in the other polarization, the resulting normalized power over the two polarizations is equal a constant value for all symbols generated using ME-8QAM.

In ME-8QAM, each symbol corresponds to an input to the modulation encoding function (e.g., ME-encoders $410_{1...4}$ in FIG. 4) of six (6) bits, which has $2^6$=64 bit patterns. The 6 bits are mapped onto the X (Xpol) and Y (Ypol) constellations, which each have twelve possible points in the respective I-Q plane and thus provide up to 12×12=144 combinations, or possible symbol mappings, when regarded as a 4D [X Y] signal. According to ME-8QAM, 64 of the 144 possible Xpol/Ypol point combinations are selected and used as symbols with the desired constraint of constant intensity or power modulus of $|X|^2+|Y|^2$=constant (C), where $X=|XI|^2+|XQ|^2$ is assumed to be the power of the symbol in the Xpol over the amplitude values (e.g., voltages) XI and XQ of the I and Q components of the X polarized optical signal and $Y=|YI|^2+|YQ|^2$ is assumed to be power of the symbol in the Ypol over the amplitude values YI and YQ of I and Q components of the Y polarized optical signal.

Figure 3:
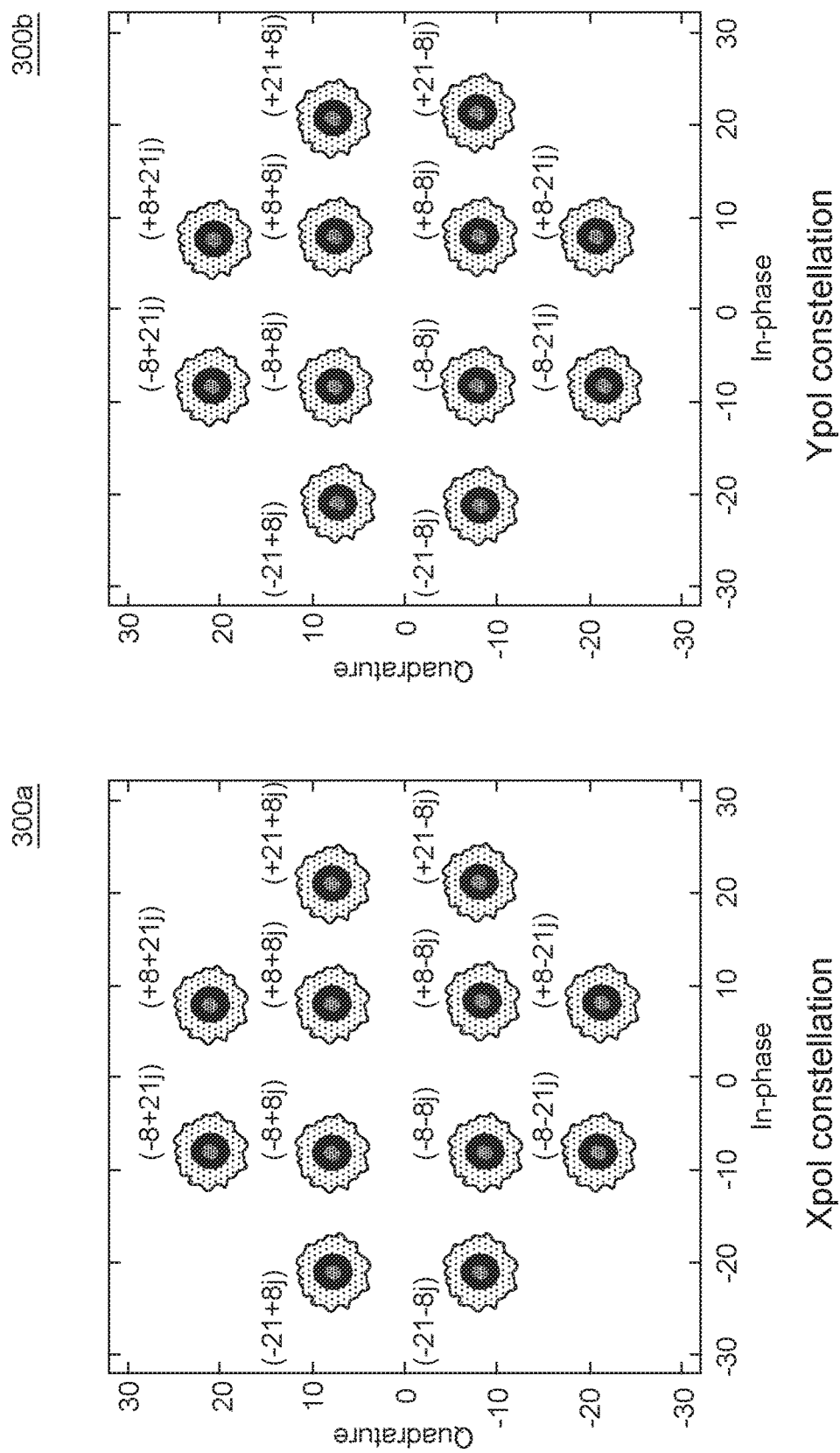
FIG. 3 shows example constellation diagrams of the x polarization and y polarization constellations for ME-8QAM, in accordance with the disclosures herein.

FIG. 3 shows example Xpol and Ypol constellations 300a and 300b for ME-8QAM, such that the points in the Xpol constellation 300a have the same amplitudes and phases as the points in the Ypol constellation 300b, and Table 1 shows a corresponding example bit to dual-polarization symbol mapping for ME-8QAM 6 bit quantization. The constellations 300a and 300b in FIG. 3 show the probabilistic spread of the symbols due to noise (compared to the idealized constellations shown in FIGS. 1 and 2). The IQ coordinate values, bit-to-symbol mappings, and bit orderings described herein are examples, such that other values, mappings and bit orderings may be used similarly based on the disclosures herein.

In the example of FIG. 3 and Table 1, the ME-8QAM encoding function may be represented by the 64 row by 4 column encoding matrix shown in Table 1, such that every 6 bits may be used to locate a row in the encoding matrix (Table 1), and the four output columns represents the XI, XQ, YI and YQ amplitudes of the I and Q components of a symbol in the Xpol and Ypol planes (e.g., for a single subcarrier in a multi-subcarrier system). The example 6 bit quantization given in Table 1 optimizes the ratio between the inner and outer intensity rings of ME-8QAM to reduce the required signal-to-noise ratio (SNR) at the forward error correction (FEC) bit error rate (BER) threshold, however any other bit quantization may be used.

For each of the Xpol and Ypol constellations 300a and 300b, the four (4) inner points (i.e., on an inner intensity ring) each have quadrature and in-phase components with a magnitude scaled to an integer value of 8, and a total intensity of $|XI|^2+|xQ|^2=|YI|^2+|YQ|^2=|\pm 8|^2+|\pm 8|^2=128$, and the eight (8) outer points (i.e., on the outer intensity ring) each have a combination of quadrature and in-phase components of scaled integer magnitude 8 and 21, such that the total intensity is $|I|^2+|Q|^2=|\pm 8|^2+|\pm 21|^2=505$. Because different intensity rings are always used in the Xpol versus the Ypol for a symbol, each of the 64 possible dual-polarization symbols has a total intensity of 128+505=633, ensuring the constant power modulus property of the ME-8QAM modulation.

For example, the four inner points may have the following complex valued IQ coordinates corresponding to two bit numbers: 8+8j ("00"), −8+8j ("01"), −8−8j ("11"), and 8−8j ("10"). The eight outer symbols may be designated with IQ coordinates 21+8j, 8+21j, −8+21j, −21+8j, −21−8j, −8−21j, 8−21j, and 21−8j, and the corresponding binary numbers 000, 001, 011, 010, 110, 111, 101, and 100, respectively (these binary numbers are Gray code binary numbers such that the binary numbers for neighboring points in the constellation differ in only one bit).

In the example of FIG. 3 and Table 1, the six bits being encoded may be represented according to the bit ordering b5b4b3b2b1b0, where b5 may be the most significant bit (MSB), b0 may be the least significant bit (LSB), and the corresponding decimal numbers are from 0 to 63, as shown in Table 1. A value of b0=1 is associated with the outer ring in the Xpol constellation 300a and the inner ring in the Ypol constellation 300b. Accordingly, a value of b0=0 is associated with the inner ring in the Xpol constellation 300a and the outer ring in the Ypol constellation 300b. Thus, when b0=1, bits b3b2b1 indicate one of the eight points on the outer intensity ring on the Xpol constellation 300a and bits b5b4 indicate one of the four points on the inner intensity ring in the Ypol constellation 300b. When b0=0, bits b2b1 indicate one of the four points on the inner ring of the Xpol constellation 300a and bits b5b4b3 indicate one of the eight points on the outer ring of the Ypol constellation 300b.

In an example as seen in Table 1, if b5b4b3b2b1b0=000110 (or decimal value 6), then b1=0 provides that [X Y]=[XI XQ YI YQ]=[−8−8j 21+8j], with the symbol being in the third quadrant on the inner ring in the Xpol constellation 300a, as shown, and the first quadrant on the outer ring in the Ypol constellation 300b, as shown. In another example, if b5b4b3b2b1b0=000111 (or decimal value 7), then b1=1 provides that [X Y]=[XI XQ YI YQ]= [−21−8j 8+8j].

TABLE 1 example bit-to-symbol mapping for ME-8QAM modulation format

| 6 Bit binary number | | | | | | Decimal value | XI | XQ | YI | YQ | $|X|^2 + |Y|^2$ |
|---|---|---|---|---|---|---|---|---|---|---|---|
| b5 | b4 | b3 | b2 | b1 | b0 | | | | | | |
| 0 | 0 | 0 | 0 | 0 | 0 | 0  | 8   | 8   | 21  | 8   | 633 |
| 0 | 0 | 0 | 0 | 0 | 1 | 1  | 21  | 8   | 8   | 8   | 633 |
| 0 | 0 | 0 | 0 | 1 | 0 | 2  | 8   | -8  | 21  | 8   | 633 |
| 0 | 0 | 0 | 0 | 1 | 1 | 3  | 21  | -8  | 8   | 8   | 633 |
| 0 | 0 | 0 | 1 | 0 | 0 | 4  | -8  | 8   | 21  | 8   | 633 |
| 0 | 0 | 0 | 1 | 0 | 1 | 5  | -21 | 8   | 8   | 8   | 633 |
| 0 | 0 | 0 | 1 | 1 | 0 | 6  | -8  | -8  | 21  | 8   | 633 |
| 0 | 0 | 0 | 1 | 1 | 1 | 7  | -21 | -8  | 8   | 8   | 633 |
| 0 | 0 | 1 | 0 | 0 | 0 | 8  | 8   | 8   | 8   | 21  | 633 |
| 0 | 0 | 1 | 0 | 0 | 1 | 9  | 8   | 21  | 8   | 8   | 633 |
| 0 | 0 | 1 | 0 | 1 | 0 | 10 | 8   | -8  | 8   | 21  | 633 |
| 0 | 0 | 1 | 0 | 1 | 1 | 11 | 8   | -21 | 8   | 8   | 633 |
| 0 | 0 | 1 | 1 | 0 | 0 | 12 | -8  | 8   | 8   | 21  | 633 |
| 0 | 0 | 1 | 1 | 0 | 1 | 13 | -8  | 21  | 8   | 8   | 633 |
| 0 | 0 | 1 | 1 | 1 | 0 | 14 | -8  | -8  | 8   | 21  | 633 |
| 0 | 0 | 1 | 1 | 1 | 1 | 15 | -8  | -21 | 8   | 8   | 633 |
| 0 | 1 | 0 | 0 | 0 | 0 | 16 | 8   | 8   | -21 | 8   | 633 |
| 0 | 1 | 0 | 0 | 0 | 1 | 17 | 21  | 8   | -8  | 8   | 633 |
| 0 | 1 | 0 | 0 | 1 | 0 | 18 | 8   | -8  | -21 | 8   | 633 |
| 0 | 1 | 0 | 0 | 1 | 1 | 19 | 21  | -8  | -8  | 8   | 633 |
| 0 | 1 | 0 | 1 | 0 | 0 | 20 | -8  | 8   | -21 | 8   | 633 |
| 0 | 1 | 0 | 1 | 0 | 1 | 21 | -21 | 8   | -8  | 8   | 633 |
| 0 | 1 | 0 | 1 | 1 | 0 | 22 | -8  | -8  | -21 | 8   | 633 |
| 0 | 1 | 0 | 1 | 1 | 1 | 23 | -21 | -8  | -8  | 8   | 633 |
| 0 | 1 | 1 | 0 | 0 | 0 | 24 | 8   | 8   | -8  | 21  | 633 |
| 0 | 1 | 1 | 0 | 0 | 1 | 25 | 8   | 21  | -8  | 8   | 633 |
| 0 | 1 | 1 | 0 | 1 | 0 | 26 | 8   | -8  | -8  | 21  | 633 |
| 0 | 1 | 1 | 0 | 1 | 1 | 27 | 8   | -21 | -8  | 8   | 633 |
| 0 | 1 | 1 | 1 | 0 | 0 | 28 | -8  | 8   | -8  | 21  | 633 |
| 0 | 1 | 1 | 1 | 0 | 1 | 29 | -8  | 21  | -8  | 8   | 633 |
| 0 | 1 | 1 | 1 | 1 | 0 | 30 | -8  | -8  | -8  | 21  | 633 |
| 0 | 1 | 1 | 1 | 1 | 1 | 31 | -8  | -21 | -8  | 8   | 633 |
| 1 | 0 | 0 | 0 | 0 | 0 | 32 | 8   | 8   | 21  | -8  | 633 |
| 1 | 0 | 0 | 0 | 0 | 1 | 33 | 21  | 8   | 8   | -8  | 633 |
| 1 | 0 | 0 | 0 | 1 | 0 | 34 | 8   | -8  | 21  | -8  | 633 |
| 1 | 0 | 0 | 0 | 1 | 1 | 35 | 21  | -8  | 8   | -8  | 633 |
| 1 | 0 | 0 | 1 | 0 | 0 | 36 | -8  | 8   | 21  | -8  | 633 |
| 1 | 0 | 0 | 1 | 0 | 1 | 37 | -21 | 8   | 8   | -8  | 633 |
| 1 | 0 | 0 | 1 | 1 | 0 | 38 | -8  | -8  | 21  | -8  | 633 |
| 1 | 0 | 0 | 1 | 1 | 1 | 39 | -21 | -8  | 8   | -8  | 633 |
| 1 | 0 | 1 | 0 | 0 | 0 | 40 | 8   | 8   | 8   | -21 | 633 |
| 1 | 0 | 1 | 0 | 0 | 1 | 41 | 8   | 21  | 8   | -8  | 633 |
| 1 | 0 | 1 | 0 | 1 | 0 | 42 | 8   | -8  | 8   | -21 | 633 |
| 1 | 0 | 1 | 0 | 1 | 1 | 43 | 8   | -21 | 8   | -8  | 633 |
| 1 | 0 | 1 | 1 | 0 | 0 | 44 | -8  | 8   | 8   | -21 | 633 |
| 1 | 0 | 1 | 1 | 0 | 1 | 45 | -8  | 21  | 8   | -8  | 633 |
| 1 | 0 | 1 | 1 | 1 | 0 | 46 | -8  | -8  | 8   | -21 | 633 |
| 1 | 0 | 1 | 1 | 1 | 1 | 47 | -8  | -21 | 8   | -8  | 633 |
| 1 | 1 | 0 | 0 | 0 | 0 | 48 | 8   | 8   | -21 | -8  | 633 |
| 1 | 1 | 0 | 0 | 0 | 1 | 49 | 21  | 8   | -8  | -8  | 633 |
| 1 | 1 | 0 | 0 | 1 | 0 | 50 | 8   | -8  | -21 | -8  | 633 |
| 1 | 1 | 0 | 0 | 1 | 1 | 51 | 21  | -8  | -8  | -8  | 633 |
| 1 | 1 | 0 | 1 | 0 | 0 | 52 | -8  | 8   | -21 | -8  | 633 |
| 1 | 1 | 0 | 1 | 0 | 1 | 53 | -21 | 8   | -8  | -8  | 633 |
| 1 | 1 | 0 | 1 | 1 | 0 | 54 | -8  | -8  | -21 | -8  | 633 |
| 1 | 1 | 0 | 1 | 1 | 1 | 55 | -21 | -8  | -8  | -8  | 633 |
| 1 | 1 | 1 | 0 | 0 | 0 | 56 | 8   | 8   | -8  | -21 | 633 |
| 1 | 1 | 1 | 0 | 0 | 1 | 57 | 8   | 21  | -8  | -8  | 633 |
| 1 | 1 | 1 | 0 | 1 | 0 | 58 | 8   | -8  | -8  | -21 | 633 |
| 1 | 1 | 1 | 0 | 1 | 1 | 59 | 8   | -21 | -8  | -8  | 633 |
| 1 | 1 | 1 | 1 | 0 | 0 | 60 | -8  | 8   | -8  | -21 | 633 |
| 1 | 1 | 1 | 1 | 0 | 1 | 61 | -8  | 21  | -8  | -8  | 633 |
| 1 | 1 | 1 | 1 | 1 | 0 | 62 | -8  | -8  | -8  | -21 | 633 |
| 1 | 1 | 1 | 1 | 1 | 1 | 63 | -8  | -21 | -8  | -8  | 633 |

Thus, the example of ME-8QAM given in FIG. 3 and Table 1 provides a 4D bit-to-symbol mapping with a constant modulus of $|X|^2+|Y|^2=(|XI|^2+|XQ|^2)+(|YI|^2+|YQ|^2)=633$. Other variants with constant power modulus of symbols over time are possible.

In another example, the disclosed constant modulus 4D modulation system and methods may be used on each subcarrier in a digital subcarrier multiplexing systems. In a digital subcarrier multiplexing system (as described for example in U.S. patent application Ser. No. 14/986,521 and U.S. patent application Ser. No. 13/630,630, which are incorporated herein by reference in their entirety), different digitally generated subcarriers may each independently carry modulated symbols (representing encoded data) on different frequency bands (e.g., different portions of the radio frequency spectrum) at the same time, such that the frequency bands may be adjacent to one another. The disclosed ME-8QAM scheme may be used on each of the subcarriers in a digital subcarrier multiplexing system allowing for adjacent subcarriers to exhibit a constant power property (because ME-8QAM has constant power modulus), which may significantly reduce the effect of fiber nonlinearity (e.g., due to self-phase modulation (SPM) and/or cross phase modulation (XPM)) on the ability of the receiver to decode the received symbols. Furthermore, the disclosed constant modulus 4D modulation system and methods may offer improved performance through increased Euclidean distance between the encoded 4D symbols, thus increasing noise tolerance over other QAM techniques. By reducing nonlinear penalties caused by optical fiber, the disclosed constant modulus 4D modulation system and methods accordingly enable optical communication systems over longer distances.

Figure 4A:
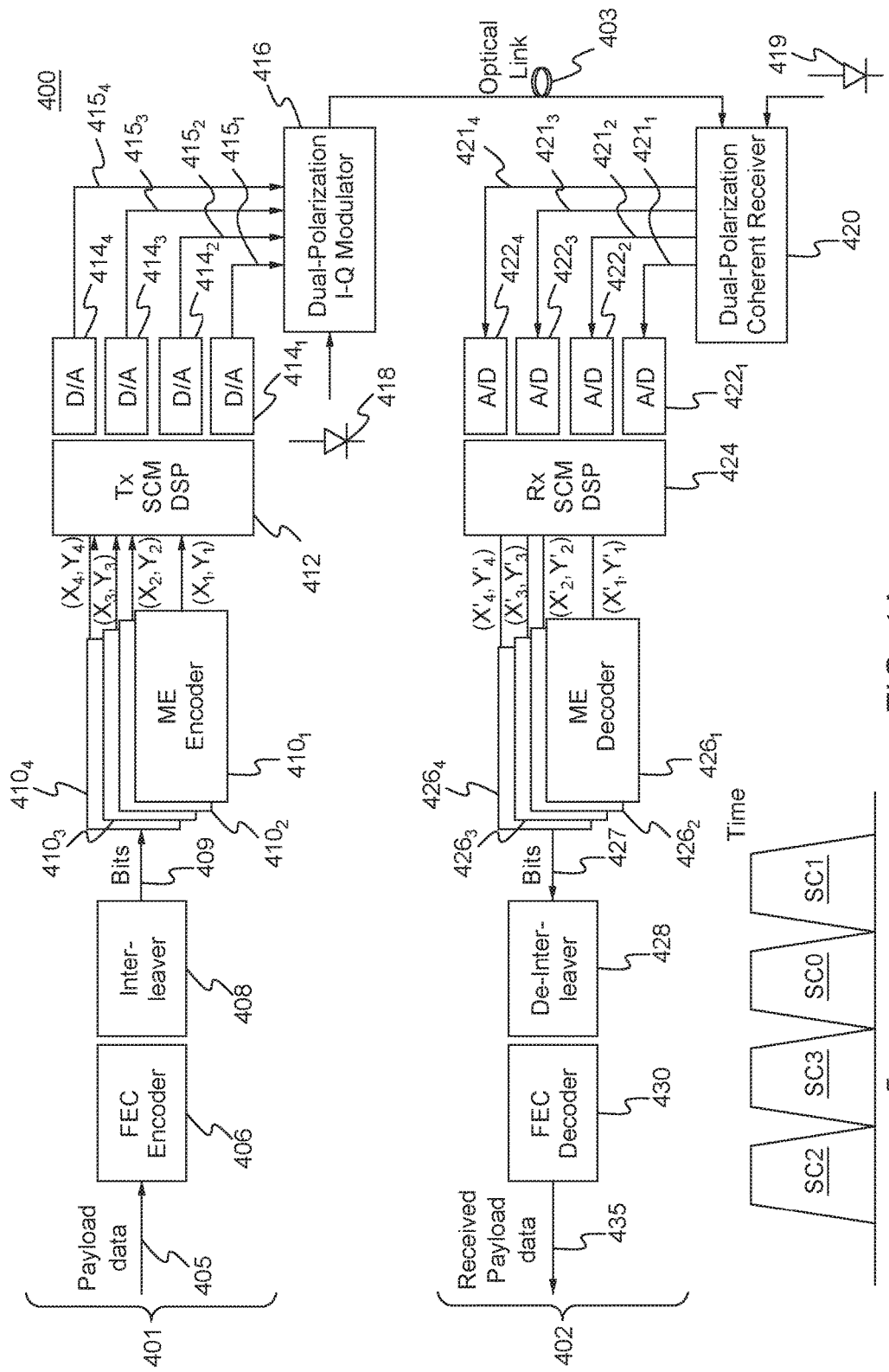
FIG. 4A is a system diagram of an example coherent optical communication system using N=4 digital subcarriers and employing the disclosed constant modulus 4D modulation encoding, in accordance with the disclosures herein.

FIG. 4A is a system diagram of an example coherent optical communication system 400 using N digital subcarriers and employing the disclosed constant modulus 4D modulation technique. The example coherent optical communication system 400 includes optical transmitter (Tx) 401 and optical receiver (Rx) 402 and illustrates an N=4 digital subcarrier multiplexed (SCM) system, such that a separate dual-polarization symbol is modulated to each digital subcarrier SC0, SC1, SC2, SC3 in parallel providing higher data rates. Although N=4 subcarriers are shown, other numbers of digital subcarriers (e.g., 1 or more subcarriers) may be used. Moreover, any combination of the components may be used or omitted in the example coherent optical communication system 400 and other components, not shown, may be included.

To combat the decreased sensitivity caused by multilevel modulation such as the disclosed constant modulus 4D modulation technique, forward error correction (FEC) may be used (e.g., using a block code, or convolutional code). At the transmitter 401, the payload data 405 may be FEC encoded by FEC encoder 406, and interleaved by interleaver 408 to form a bit stream 409. For example, the interleaver 408 may shuffle and/or group bits provided by the FEC encoder 406 to reduce the risk of bit errors at the receiver 402. Each ME encoder $410_{1 \ldots 4}$ may be used for each corresponding digital subcarrier SC0, SC1, S2, SC3 to encode bits from the bit stream 409 into output digital signals having symbols each with in-phase and quadrature components of the X and Y polarizations, shown as $(X_1, Y_1)$ for the X and Y polarization components of subcarrier SC0, $(X_2, Y_2)$ for subcarrier SC1, $(X_3, Y_3)$ for subcarrier SC2, and $(X_4, Y_4)$ for subcarrier SC3. Each ME encoder $410_{1 \ldots 4}$ output XI, XQ, YI and YQ components of each encoded (dual-polarization) symbol. Each ME encoder $410_{1 \ldots 4}$ may encode a sequence of bits according to the constant modulus 4D modulation techniques disclosed herein. For example, each ME encoder $410_{1 \ldots 4}$ may encode a sequence of 6 bits at a time using ME-8QAM modulation according to FIG. 3 and Table 1.

The Tx SCM digital signal processor (DSP) 412 may include one or more DSPs and may be configured to digitally modulate, apply spectral shaping and/or perform filtering on the digital signals for the symbols $(X_1, Y_1)$, $(X_2, Y_2)$, $(X_3, Y_3)$, and $(X_4, Y_4)$ from the ME encoders $410_{1\ldots4}$. In an example, the ME encoders $410_{1\ldots4}$ may be implemented separately from or incorporated into Tx SCM DSP 412. Digital-to-analog (D/A) converters $414_{1\ldots4}$ (and associated driver circuits, not shown), each corresponding to a digital subcarrier SC0, SC1, SC2, SC3, may convert the digital signals from Tx SCM DSP 412 to output a plurality of analog waveforms $415_{1\ldots4}$, each of which correspond to a respective analog voltage to drive the dual-polarization I-Q modulator 416. The dual-polarization I-Q modulator 416 may modulate an optical light from laser 418 using the optical subcarriers SC0, SC1, SC2, SC3 of analog waveforms $415_{1\ldots4}$ to convey the symbols in a dual-polarization optical signal transmitted over optical link 403, including an optical fiber, for example. The dual-polarization I-Q modulator 416 may split the optical light from laser 418 into X and Y polarizations (with XI and XQ and YI and YQ components) for each subcarrier SC0, SC1, SC2, SC3, and is described in more detail in FIG. 4B below.

At the receiver 402 on the other end of the optical link 403, the dual-polarization coherent receiver 420 may receive a reference signal from a local oscillator 419 (e.g., a laser) and convert the received optical signal transmitted by the optical transmitter 401 over the optical link 403 to baseband analog signals $421_{1\ldots4}$ (carrying received symbols each with XI', XQ', YI', YQ' components) for each of the subcarriers SC0, SC1, SC2, SC3. The dual-polarization coherent receiver 420 is described in more detail in FIG. 4C below.

The analog-to-digital (A/D) converters $422_{1\ldots4}$ may convert for each subcarrier SC0, SC1, SC2, SC3 the analog signals $421_{1\ldots4}$ to digital signals and Rx SCM DSP 424 may process the digital signals (e.g., reduce phase noise, chromatic dispersion, timing skews due to transmission) to output digitized sequences of symbols $[X_1', Y_1']$, $[X_2', Y_2']$, $[X_3', Y_3']$, and $[X_4', Y_4']$ (i.e., each symbol has respective XI, XQ, YI and YQ components) for each respective digital subcarrier SC0, SC1, SC2, SC3. The symbols $[X_1', Y_1']$, $[X_2', Y_2']$, $[X_3', Y_3']$, and $[X_4', Y_4']$ represent constant modulus 4D constellation points (e.g., ME-8QAM constellation points shown in FIGS. 2A, 2B and 3). The decoders $426_{1\ldots4}$ may decode the symbols $[X_1', Y_1']$, $[X_2', Y_2']$, $[X_3', Y_3']$, and $[X_4', Y_4']$ for each respective digital subcarrier SC0, SC1, SC2, SC3 to generate bits 427. For example, if the disclosed ME-8QAM modulation is used at the transmitter 401, then the decoders $426_{1\ldots4}$ decode six (6) bits per symbol per subcarrier. In an example, maximum-correlation decoding may be used by decoders $426_{1\ldots4}$, although other decoding techniques may be used. The detected bits 427 may be de-interleaved from the digital subcarriers by deinterleaver 428 (e.g., corresponding to the rearranging or bit grouping performed by the interleaver 408 at the transmitter 401) before being provided to the FEC decoder 430 to generate the received payload data 435.

Figure 4B:
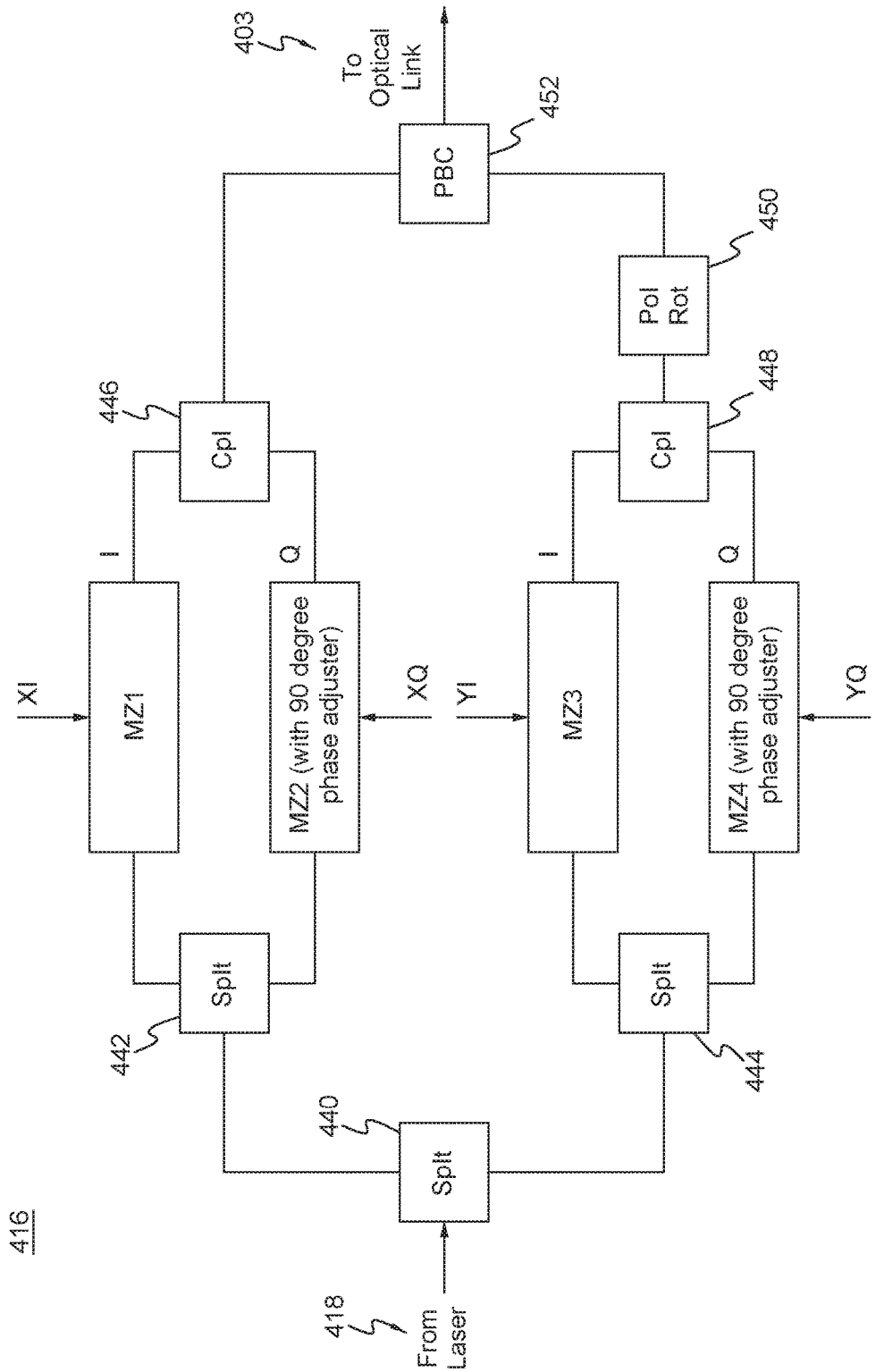
FIG. 4B is a system diagram of an example dual-polarization I-Q modulator, in accordance with the disclosures herein.

FIG. 4B shows an example of dual polarization modulator 416 in greater detail. Modulator 416 may include a coupler, such as a multimode interference coupler, or splitter 440 that receives continuous wave (CW) light output from laser 418. Splitter 440 supplies a first portion of such CW light to splitter 442 and a second portion of such light to splitter 444. Splitter 442 further splits the light into first and second portions that are supplied to Mach-Zehnder (MZ) modulators MZ1 and MZ2, respectively. Modulator MZ1 modulates the first portion of the light to provide an in-phase (I) component of the Xpol portion of each subcarrier in accordance with drive signal XI, and modulator MZ2, which may include a 90 degree phase adjuster, modulates the second portion of the light to supply the quadrature (Q) component of the Xpol portion of each subcarrier in accordance with drive signal XQ. The I and Q Xpol components are then combined by coupler 446, which may also include a multimode interference (MMI) coupler.

Splitter 440, as noted above, supplies a power split portion of the light output from laser 418. As further shown in FIG. 4B, the power split portion is supplied to splitter 444, which supplies third and fourth portions of the light to Mach-Zehnder modulators MZ3 and MZ4, respectively. Modulator MZ3 modulates the third portion of the light to provide an in-phase (I) component of the Ypol portion of each subcarrier in accordance with drive signal YI, and modulator MZ4, which may include a 90 degree phase adjuster, modulates the fourth portion of the light to supply the quadrature (Q) component of the Ypol portion of each subcarrier in accordance with drive signal YQ. The I and Q Ypol components are then combined by coupler 448, which may include an MMI coupler.

It is noted that the light output from laser 418 has a given polarization, such as the X polarization, accordingly the optical signals output from couplers 446 and 448 also have the X polarization. Thus, the modulated optical signals output from coupler 448 may be supplied to a polarization rotator 450 that rotates the polarization of such optical signals to have the Y polarization. The output from polarization rotator 450 and the output of coupler 446 are provided to a polarization beam combiner (PBC) 452, which combines the received Xpol and Ypol optical signals onto an optical communication path, such as a waveguide or optical fiber, which, in turn, supplies the combined or polarization multiplexed optical signals to optical link 403.

Figure 4C:
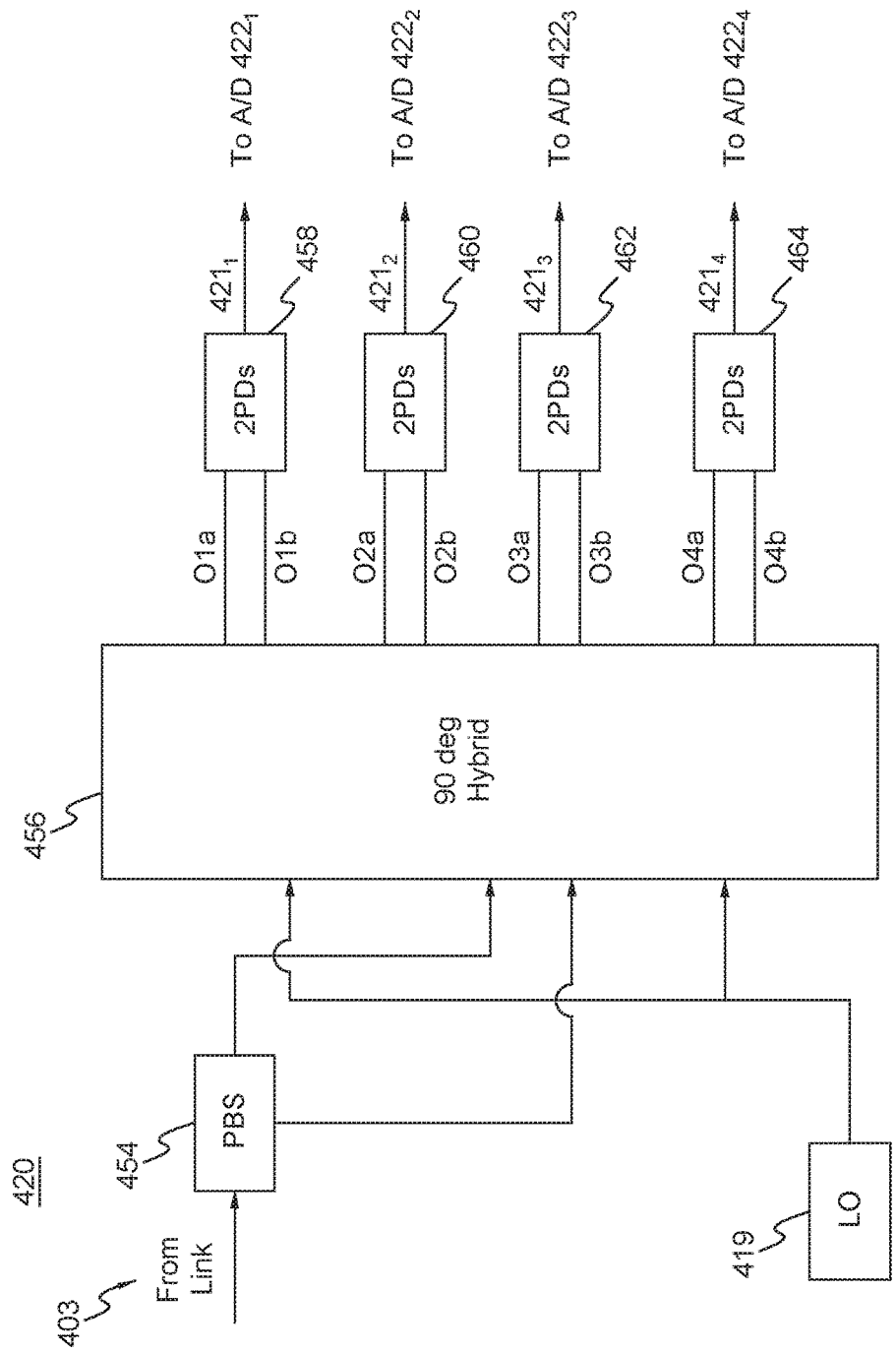
FIG. 4C is a system diagram of an example dual-polarization coherent receiver, in accordance with the disclosures herein.

The modulated optical signals may be attenuated during propagation along optical link 403. Accordingly, such optical signals may be amplified by one or more optical amplifiers, such as doped fiber amplifiers, provided along link 403. After propagating along link 403, the modulated optical signals, including the subcarriers noted above, are next supplied to dual polarization coherent receiver 420, as noted above. FIG. 4C shows an example of coherent receiver 420 in greater detail.

Coherent receiver 420 may include a polarization beam splitter (PBS) 454 operable to receive the modulated optical signals noted above and to separate the signals into X and Y orthogonal polarizations components, i.e., vector components of the optical E-field of the incoming optical signal transmitted on optical link 403. The orthogonal polarization components are then mixed with light from local oscillator (LO) laser 419 in 90 degree optical hybrid circuit ("hybrid") 456. Hybrid 456 may output four optical signals O1a, O1b, O2a, O2b, O3a, O3b, O4a, and O4b, each representing the in-phase and quadrature components of the optical E-field on X and Y polarization components, and each including corresponding portions of light from local oscillator 419 and light from polarization beam splitter 454. Optical signals or mixing products O1a, O1b, O2a, O2b, O3a, O3b, O4a, and O4b are supplied to a respective one of photodetector circuits 458, 460, 462, and 464. Each photodetector circuit includes a pair of photodiodes ("2PDs") configured as a balanced detector, for example. As further shown in FIG. 4C, based on the received mixing products, each photodetector circuit 458, 460, 462, and 464 outputs a respective one of baseband analog signals $421_{1\ldots4}$, each with XI', XQ', Yr, YQ' components for the received symbols for each of the subcarriers SC0, SC1, SC2, SC3 (each received symbols having an XI component, XQ component, YI component, and YQ component), as noted above. As further noted above, each of baseband analog signals $421_{1\ldots 4}$, is next supplied to a respective one of A/D converters $422_{1\ldots 4}$, via a corresponding transimpedance amplifier (not shown), for example.

Figure 5:
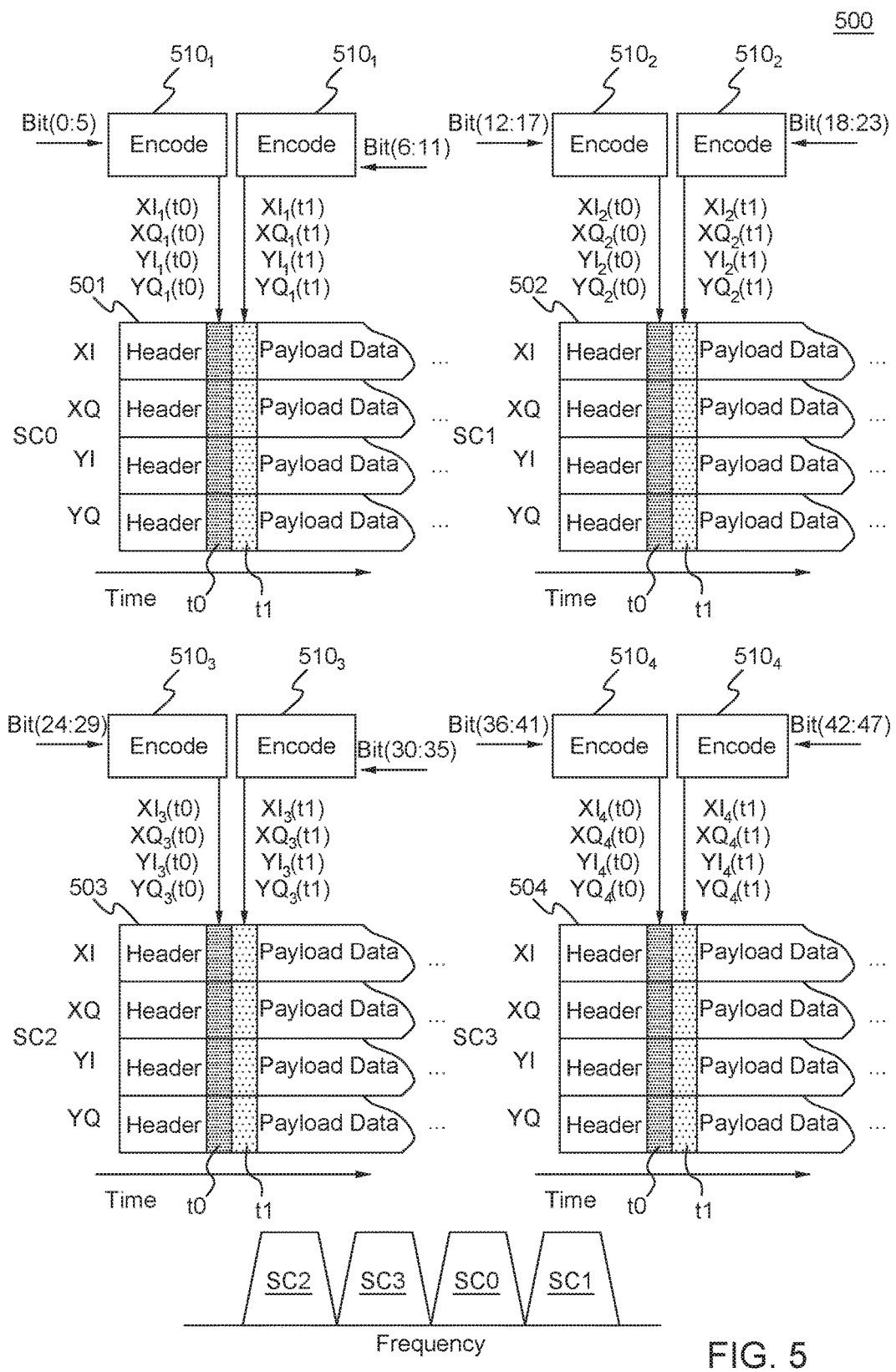
FIG. 5 is a system diagram of an example implementation of an ME-8QAM encoder system that may be used in a coherent optical transmitter using digital subcarriers, in accordance with the disclosures herein.

FIG. 5 is a system diagram of an example implementation of an ME-8QAM encoder system 500 (e.g., ME encoders $410_{1\ldots 4}$ in FIG. 4A) that may be used in a coherent optical transmitter using digital subcarriers (e.g., transmitter 401 in FIG. 4A), in accordance with the disclosures herein. The example of FIG. 5 includes four digital subcarriers SC0, SC1, SC2 and SC3, where frame 501 is transmitted on subcarrier SC0, and frame 502 is carried on subcarrier SC1, frame 503 is carried on subcarrier SC2 and frame 504 is carried on subcarrier SC3. In this example, a frame 501, 502, 503 and 504 may include a header and payload data. The bits in a header may be known a-priori at the receiver (e.g., receiver 402 in FIG. 4A) and the receiver may synchronize to the header.

For each subcarrier SC0, SC1, SC2, SC3, the corresponding ME-8QAM encoders $510_{1\ldots 4}$ may operate and encode bits in parallel as shown. Moreover, ME encoder $510_1$ (and similarly encoders $510_2$, $510_3$, $510_4$) may be implemented as a single encoder function applied to groups of 6 bits consecutively at times t0 and t1, or as two separate encoder functions applied to groups of 6 bits at time t0 and t1. For example, ME encoder $510_1$ at time t0 may take 6 input bits [0:5] and map them to an output symbol: $XI_1[t0]$, $XQ_1[t0]$, $YI_1[t0]$, $YQ_1[t0]$ (e.g., using the mapping technique described above in FIGS. 2 and 3 and according to Table 1), and insert them into frame 501. ME encoder $510_1$ at time t1 may take the next 6 input bits [6:11] and map them to an output symbol: $XI_1[t1]$, $XQ_1[t1]$, $YI_1[t1]$, $YQ_1[t1]$, and also insert them into frame 501.

In parallel, ME encoder $510_2$ at time t0 may take 6 input bits [12:17] and map them to an output symbol $XI_2[t0]$, $XQ_2[t0]$, $YI_2[t0]$, $YQ_2[t0]$ and insert them into frame 502. ME encoder $510_2$ at time t1 may take the next 6 input bits [18:23] and map them to an output symbol: $XI_2[t1]$, $XQ_2[t1]$, $YI_2[t1]$, $YQ_2[t1]$, and also insert them into frame 502. Similar encodings may be performed in parallel at times t0 and t1 by encoder $510_3$ for bits bit[24:29] and bit[30:35] for subcarrier SC2 to generate and insert symbols $XI_3[t0]$, $XQ_3[t0]$, $YI_3[t0]$, $YQ_3[t0]$ and $XI_3[t1]$, $XQ_3[t1]$, $YI_3[t1]$, $YQ_3[t1]$ into frame 503, and by encoder $510_4$ for bits bit[36:41] and bit[42:47] for SC3 to generate and insert symbols $XI_4[t0]$, $XQ_4[t0]$, $YI_4[t0]$, $YQ_4[t0]$ and $XI_4[t1]$, $XQ_4[t1]$, $YI_4[t1]$, $YQ_4[t1]$ into frame 504.

As explained above, each digital subcarrier SC0-SC3 may use a dedicated ME Encoder $510_{1\ldots 4}$. Consequently, each digital subcarrier SC0-SC3 is modulated independently as ME-8QAM and thus has a constant modulus 4D format for the X and Y polarizations of a single subcarrier in a single time slot. FIG. 5 provides an example encoding system 500 for multiple subcarriers, such that other arrangements are possible. In a different example not shown, every consecutive 6 bits may be encoded onto a different subcarrier (e.g., bit(6:11) may be encoded by encoder $510_2$ onto subcarrier SC1, bit(12:17) may be encoded by encoder $510_3$ onto subcarrier SC2, and bit(18:23) may be encoded by encoder $510_4$ onto subcarrier SC3, and so forth).

Figure 6A:
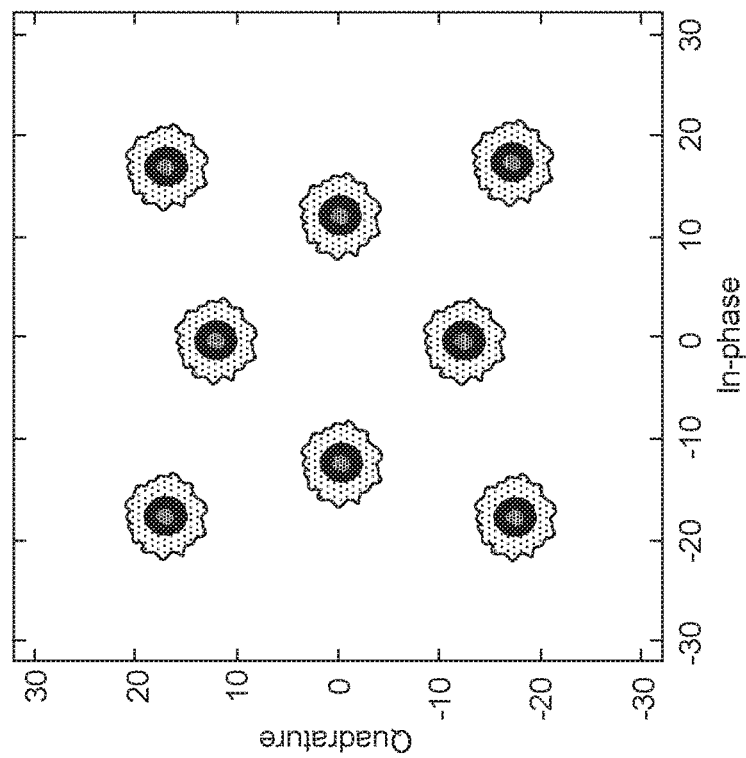
FIGS. 6A and 6B are constellation diagrams of example X polarization constellations for ME-8QAM and four dimensional (4D) star-8QAM at a signal-to-noise ratio (SNR) equal to 22 dB.
Figure 6B:
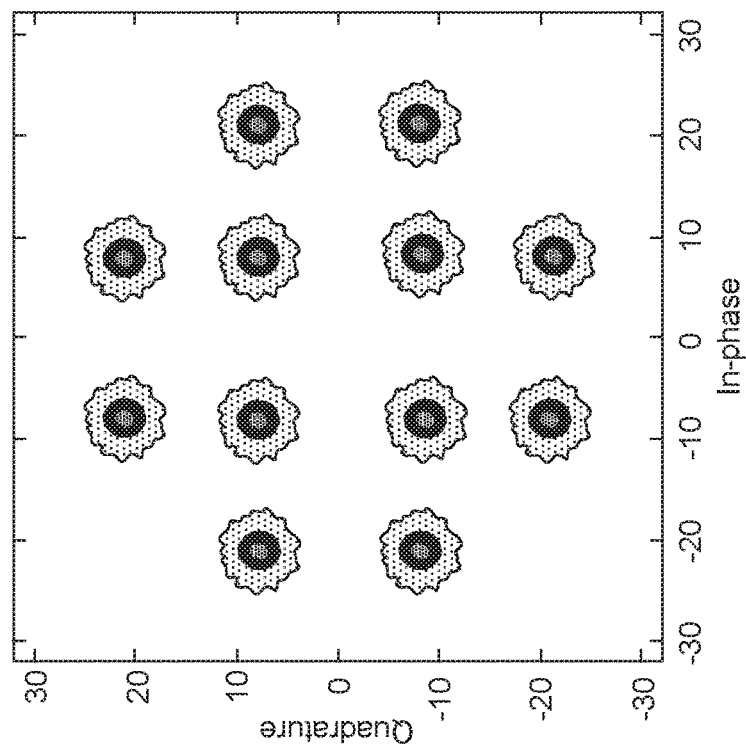

FIG. 6A is an example Xpol constellation (Ypol constellation is identical) for ME-8QAM and FIG. 6B is an example Xpol constellation (Ypol constellation is identical) for 4D star-8QAM, both at a signal-to-noise ratio (SNR) equal to 22 dB.

Figure 7:
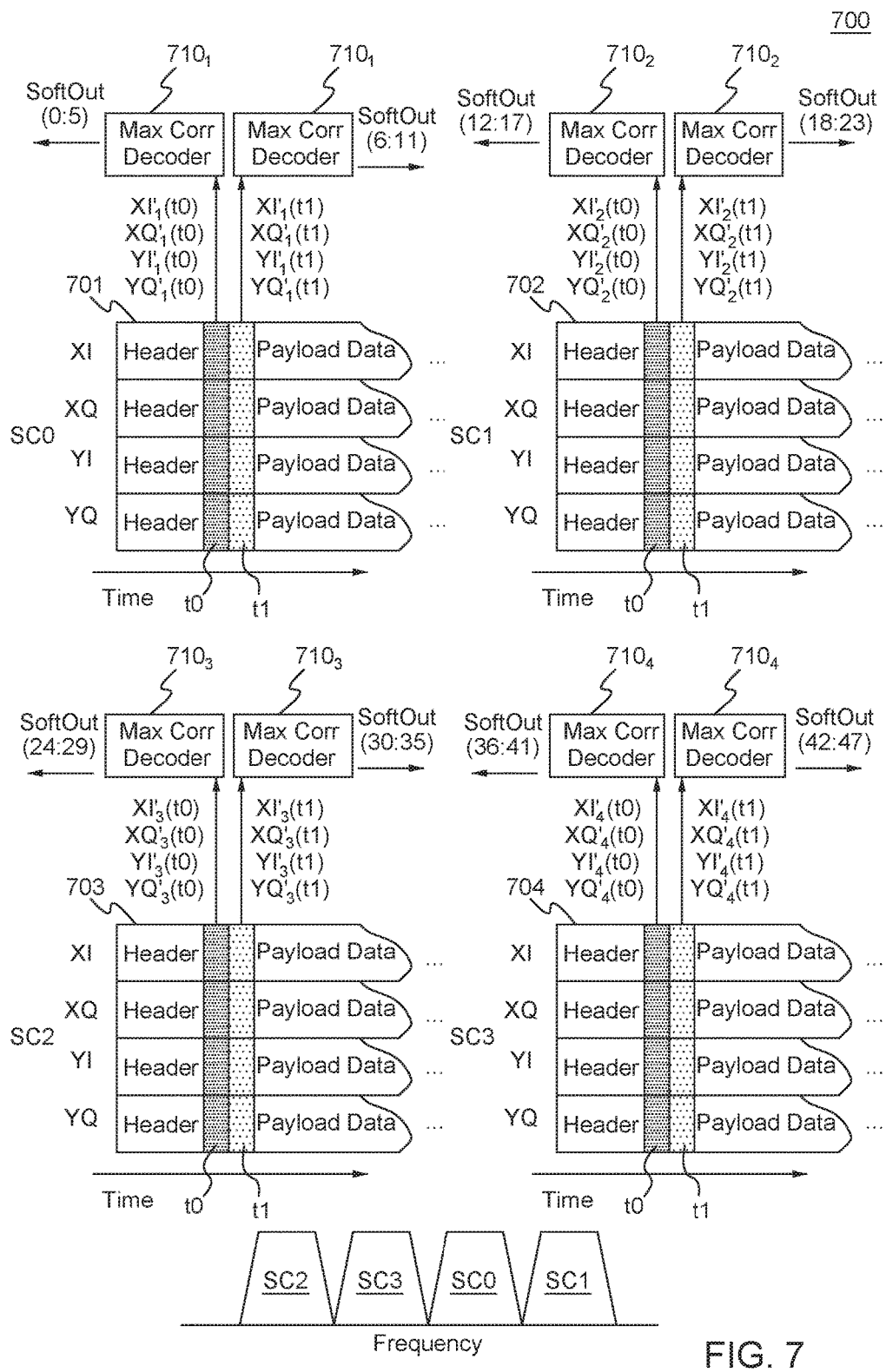
FIG. 7 is a system diagram of an example implementation of an ME-8QAM decoder system that may be used in a coherent optical receiver using digital subcarriers, in accordance with the disclosures herein.

FIG. 7 is a system diagram of an example implementation of an ME-8QAM decoder system 700 (e.g., ME decoders $426_{1\ldots 4}$ in FIG. 4A) that may be used in a coherent optical receiver (e.g., receiver 402 in FIG. 2) using digital subcarriers, in accordance with the disclosures herein. In a receiver and after Rx SCM DSP (e.g., Rx SCM DSP 424 in FIG. 4A), the ME decoder system 700 may receive as input ISI compensated and carrier-phase compensated ME-8QAM symbols. In this example, the ME decoder system 700 may use maximum correlation decoding, although other decoding schemes may be used. Each digital subcarrier SC0, SC1, SC2 and SC3 has a respective maximum correlation decoder $710_{1\ldots 4}$ and maximum correlation decoding is repeated for each of the received symbols. Frame 701 carrying encoded ME-8QAM symbols is received on subcarrier SC0, and frame 702 carrying encoded ME-8QAM symbols is received on subcarrier SC1, frame 703 carrying encoded ME-8QAM symbols is received on subcarrier SC2, and frame 703 carrying encoded ME-8QAM symbols is received on subcarrier SC3.

For each subcarrier SC0, SC1, SC2, SC3, the corresponding ME-8QAM decoders $710_{1\ldots 4}$ may operate to decode received symbols in parallel as shown. Moreover, maximum correlation decoder $710_1$ (and similarly decoders $710_2$, $710_3$, $710_4$) may be implemented as a single decoder function applied to a symbol (corresponding to 6 bits) consecutively at times t0 and t1, or as two separate encoder functions applied to two symbols at time t0 and t1, respectively.

In this example, maximum correlation decoder $710_1$ decodes at time t0 four samples from the received symbol $XI'_1[t0]$, $XQ'_1[t0]$, $YI'_1[t0]$, $YQ'_1[t0]$ in frame 701 and calculates 6 soft output samples softOut[0:5]. Maximum correlation decoder $710_1$ decodes at time t1 four samples from the next received symbol $XI'_1[t1]$, $XQ'_1[t1]$, $YI'_1[t1]$, $YQ'_1[t1]$ and calculates the next 6 soft output samples softOut [6:11]. Similarly, maximum correlation decoder $710_2$ decodes at time t0 four samples from the received symbol $XI'_2[t0]$, $XQ'_2[t0]$, $YI'_2[t0]$, $YQ'_2[t0]$ in frame 702 and calculates 6 soft output samples softOut[12:17]. Maximum correlation decoder $710_2$ decodes at time t1 four samples from the next received symbol $XI'_2[t1]$, $XQ'_2[t1]$, $YI'_2[t1]$, $YQ'_2[t1]$ in frame 702 and calculates the next 6 soft output samples softOut[18:23]. Similar steps are performed for subcarriers SC2 and SC3. Maximum correlation decoder $710_3$ decodes at time t0 four samples from the received symbol $XI'_3[t0]$, $XQ'_3[t0]$, $YI'_3[t0]$, $YQ'_3[t0]$ in frame 703 and calculates 6 soft output samples softOut[24:29]. Maximum correlation decoder $710_3$ decodes at time t1 four samples from the next received symbol $XI'_3[t1]$, $XQ'_3[t1]$, $YI'_3[t1]$, $YQ'_3[t1]$ in frame 703 and calculates the next 6 soft output samples softOut[30:35]. Maximum correlation decoder $710_4$ decodes at time t0 four samples from the received symbol $XI'_4[t0]$, $XQ'_4[t0]$, $YI'_4[t0]$, $YQ'_4[t0]$ in frame 704 and calculates 6 soft output samples softOut[36:41]. Maximum correlation decoder $710_4$ decodes at time t1 four samples from the next received symbol $XI'_4[t1]$, $XQ'_4[t1]$, $YI'_4[t1]$, $YQ'_4[t1]$ in frame 704 and calculates the next 6 soft output samples softOut[42:47].

As shown, the process is repeated for each subcarrier until the next header (i.e., the next frame) is encountered. Consequently, each digital subcarrier is demodulated independently as ME-8QAM and thus has a constant modulus 4D format for the X and Y polarizations of a single subcarrier in a single time slot. FIG. 7 provides an example decoder system 700 for multiple subcarriers, such that other arrangements are possible.

Figure 8:
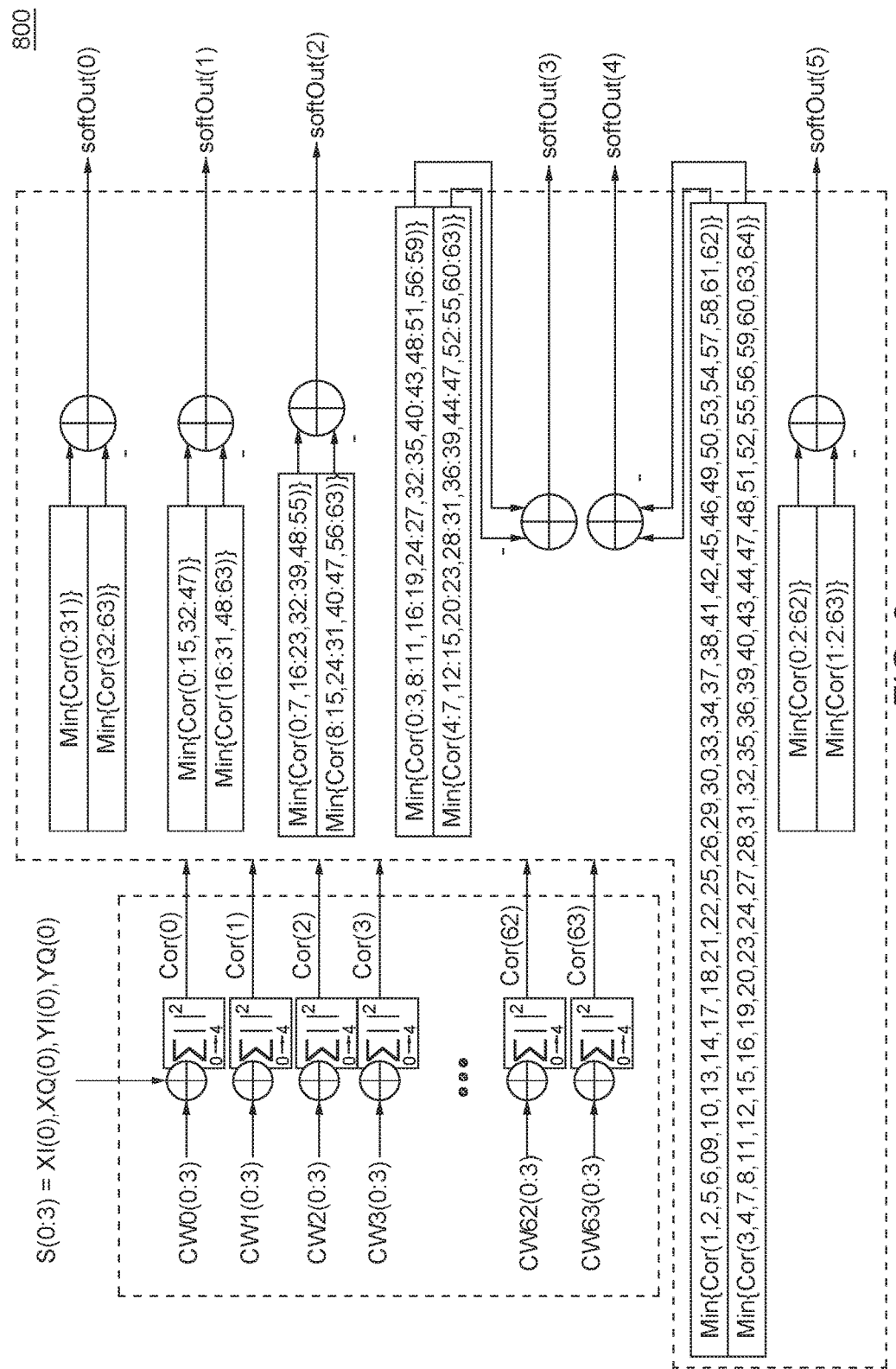
FIG. 8 is a system diagram of an example detailed implementation of a maximum correlation decoder system, in accordance with the disclosures herein.

FIG. 8 is a system diagram of an example detailed implementation of a maximum correlation decoder system 800 (e.g., maximum correlation decoder $710_{1...4}$ in FIG. 7), in accordance with the disclosures herein. The received symbol S[0:3]=XI[0], XQ[0], YI[0], YQ[0], including four digital samples, may be subtracted from four samples of the first codeword (CW0[0:3]). The received symbol S[0:3] is also subtracted from four samples of the second codeword (CW1[0:3]). The codewords are the transmitted sequences, for example the values in Table 1, where CW0 corresponds to the row with decimal value 0, CW1 corresponds to the row with decimal value 1, and so on. After subtraction, the four values XI[0], XQ[0], YI[0], YQ[0] are magnitude squared and summed to generate 64 correlations, denoted by Cor[0, 1, ... 63]. Cor[0, 1, ... 63] are used to produce 6 soft output samples softOut[0:5]. First, the minimum (represented by function Min{ }) of the 32 values are found, which is subsequently subtracted from the minimum of the remaining 32 values producing a soft output. For example, the second soft output sample softOut[1] is a result of subtracting the minimum of Cor[0:15,32:47] from the minimum of Cor[16:31,48:63]. FIG. 8 provides an example of a decoding technique that may be used for ME-8QAM, however other decoding techniques and further simplifications for more efficient implementation of decoding may be used.

Figure 9:
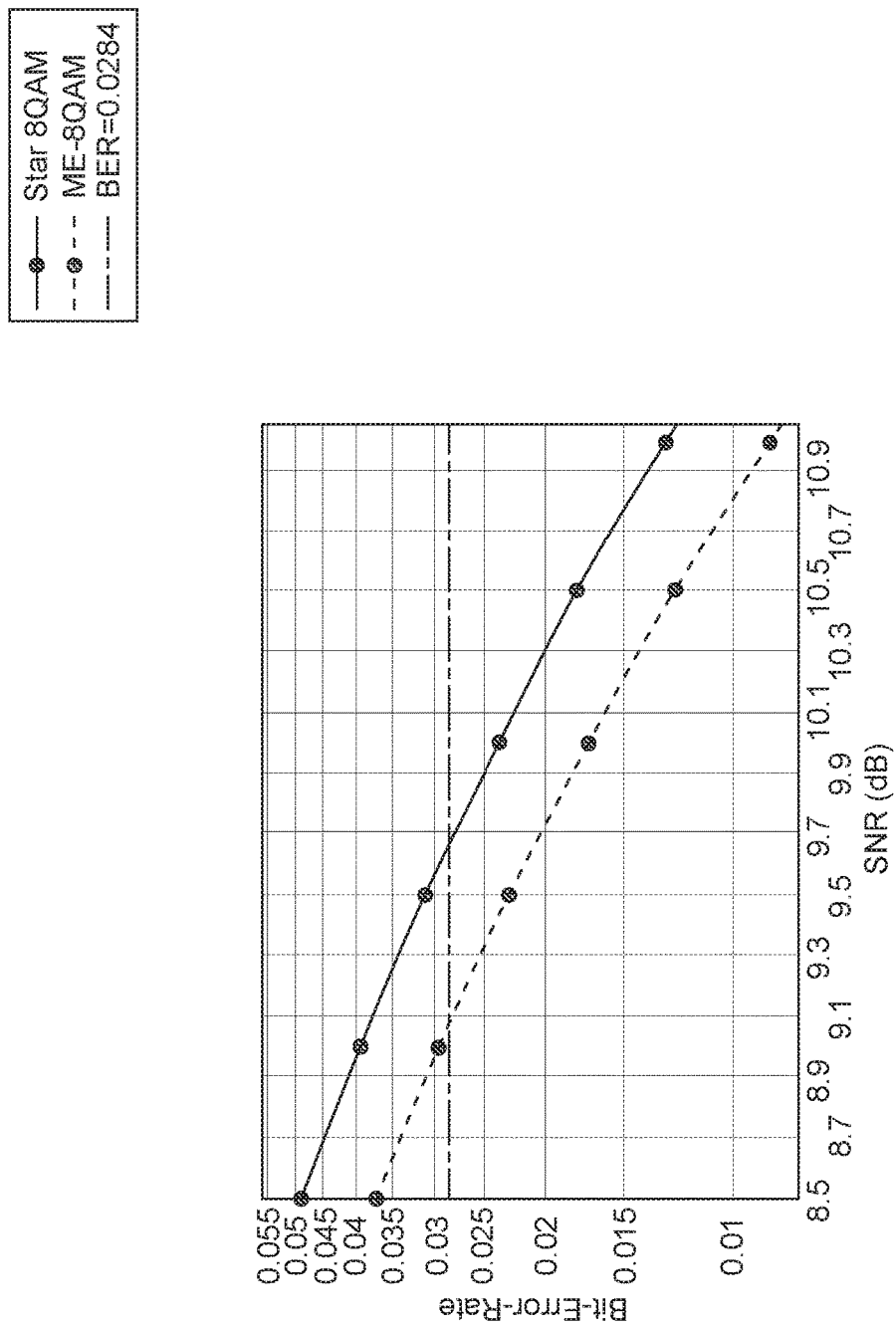
FIG. 9 shows the bit error rate (BER) versus SNR achieved by ME-8QAM and 4D star-8QAM.
Figure 10:
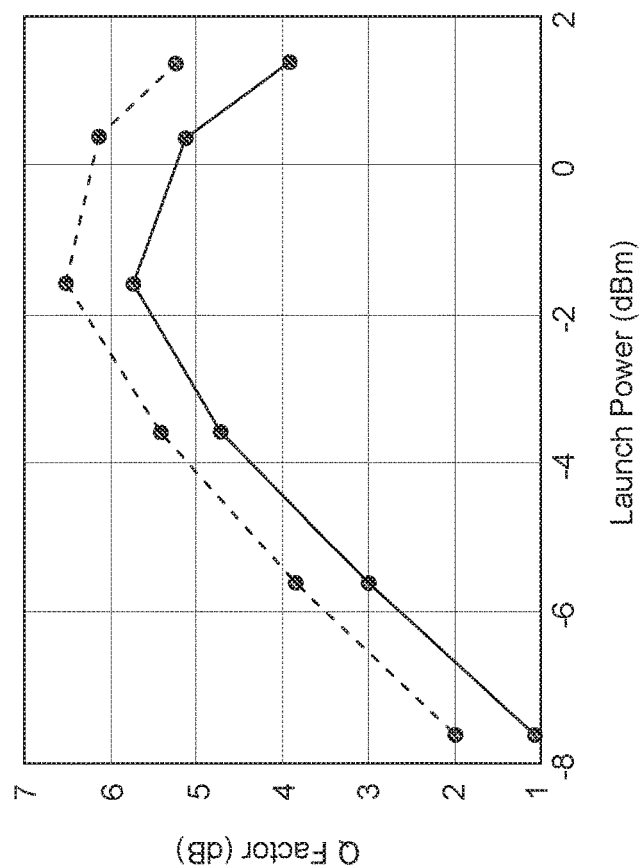
FIG. 10 shows the quality (Q) factor versus per channel launch power for ME-8QAM and 4D star-8QAM.

A property of ME-8QAM is the constant power and increased Euclidean distance between 4D symbols providing improved robustness to optical noise. FIG. 9 shows the improved output BER versus SNR achieved by ME-8QAM over another 4D modulation technique star-8QAM (i.e., where star-8QAM is used in each of Xpol and Ypol). As shown in FIG. 9, ME-8QAM offers approximately 0.6 dB SNR tolerance over 4D star-8QAM. FIG. 10 shows the quality (Q) factor in dB versus per channel launch power (in decibels in milliwatts (dBm)) for ME-8QAM and 4D star-8QAM. FIG. 10 illustrates the improved nonlinear tolerance of ME-8QAM which exhibits a higher Q value at higher optical launch powers.

It should be understood that many variations are possible based on the disclosure herein. Although features and elements are described above in particular combinations, each feature or element may be used alone without the other features and elements or in various combinations with or without other features and elements.

The methods and elements disclosed herein may be implemented in/as a general purpose computer, a processor, a processing device, or a processor core. Suitable processing devices include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods, flow charts and elements disclosed herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A coherent optical transmitter comprising:
a modulation encoder configured to:
receive a stream of bits;
encode j bits from the stream of bits by mapping the j bits to a first symbol from a plurality of dual-polarization symbols having a same constant power modulus on a two-level modulation constellation including a first intensity ring and second intensity ring in a four-dimensional (4D) space including in-phase (I), quadrature (Q), x polarization (Xpol), and y polarization (Ypol), wherein a first bit of the j bits indicates that the first symbol is on the first intensity ring for the Xpol and the second intensity ring for the Ypol, a next k bits of the j bits indicate a location of the first symbol on the first intensity ring in the Xpol, and a remaining j−k−1 bits indicate a location of the first symbol on the second intensity ring in the Ypol; and
provide the first symbol to at least a digital signal processor and a digital-to-analog converter to generate a first analog waveform corresponding to the first symbol for transmission over an optical link.

2. The coherent optical transmitter of claim 1, wherein symbols from the plurality of dual-polarization symbols on the first intensity ring have a higher power than symbols on the second intensity ring.

3. The coherent optical transmitter of claim 1, wherein symbols from the plurality of dual-polarization symbols on the first intensity ring have a lower power than symbols on the second intensity ring.

4. The coherent optical transmitter of claim 3, wherein for the plurality of dual-polarization symbols in each of the Xpol and Ypol include 4 symbols are on the first intensity ring and 8 symbols are on the second intensity ring.

5. The coherent optical transmitter of claim 1, wherein symbols from the plurality of dual-polarization symbols on the first intensity ring have a same first power and symbols on the second intensity ring have a same second power.

6. The coherent optical transmitter of claim 1, wherein the modulation encoder is configured to encode j=6 bits and the plurality of dual-polarization symbols include 64 symbols having the same constant power modulus.

7. The coherent optical transmitter of claim 1 comprising multiple independent versions of the modulation encoder corresponding to a plurality of digital subcarriers.

8. The coherent optical transmitter of claim 1 further comprising:
a forward error correction (FEC) encoder configured to encode payload data; and
an interleaver configured to interleave the encoded payload data to generate the stream of bits.

9. A coherent optical receiver comprising:
a modulation decoder configured to:
receive a first symbol comprising XI, XQ, YI, and YQ components, wherein the first symbol is from a plurality of dual-polarization symbols having a same constant power modulus on a two-level modulation constellation including a first intensity ring and second intensity ring in a four-dimensional (4D) space including in-phase (I), quadrature (Q), x polarization (Xpol), and y polarization (Ypol); and decode the first symbol using maximum correlation decoding to generate j bits, wherein a first bit of the j bits corresponds to the first symbol being on the first intensity ring for the Xpol and the second intensity ring for the Ypol, a next k bits of the j bits correspond to a location of the first symbol on the first intensity ring in the Xpol, and a remaining j−k−1 bits correspond to a location of the first symbol on the second intensity ring in the Ypol.

10. The coherent optical receiver of claim 9, wherein symbols from the plurality of dual-polarization symbols on the first intensity ring have a same first power and symbols on the second intensity ring have a same second power.

11. A method for four-dimensional (4D) modulation performed by a coherent optical transmitter, the method comprising:

encoding j bits from a stream of bits by mapping the j bits to a first symbol from a plurality of dual-polarization symbols having a same constant power modulus on a two-level modulation constellation including a first intensity ring and second intensity ring in a 4D space including in-phase (I), quadrature (Q), x polarization (Xpol), and y polarization (Ypol), wherein a first bit of the j bits indicates that the first symbol is on the first intensity ring for the Xpol and the second intensity ring for the Ypol, a next k bits of the j bits indicate a location of the first symbol on the first intensity ring in the Xpol, and a remaining j−k−1 bits indicate a location of the first symbol on the second intensity ring in the Ypol; and generating a first analog waveform corresponding to the first symbol for transmission over an optical link.

12. The method of claim 11, wherein symbols from the plurality of dual-polarization symbols on the first intensity ring have a higher power than symbols on the second intensity ring.

13. The method of claim 11, wherein symbols from the plurality of dual-polarization symbols on the first intensity ring have a lower power than symbols on the second intensity ring.

14. The method of claim 13, wherein for the plurality of dual-polarization symbols in each of the Xpol and Ypol include 4 symbols are on the first intensity ring and 8 symbols are on the second intensity ring.

15. The method of claim 11, wherein symbols from the plurality of dual-polarization symbols on the first intensity ring have a same first power and symbols on the second intensity ring have a same second power.

16. The method of claim 11, wherein j=6 bits are encoded and the plurality of dual-polarization symbols include 64 symbols having the same constant power modulus.

17. The method of claim 11 performed by a plurality of modulation encoders in the coherent optical transmitter corresponding to a plurality of digital subcarriers.

18. The method of claim 11 further comprising:

encoding payload data; and interleaving the encoded payload data to generate the stream of bits.

* * * * *